J. T. GUTHRIE.
Detaching Horses.
No. 51,941.
Patented Jan. 9, 1866.
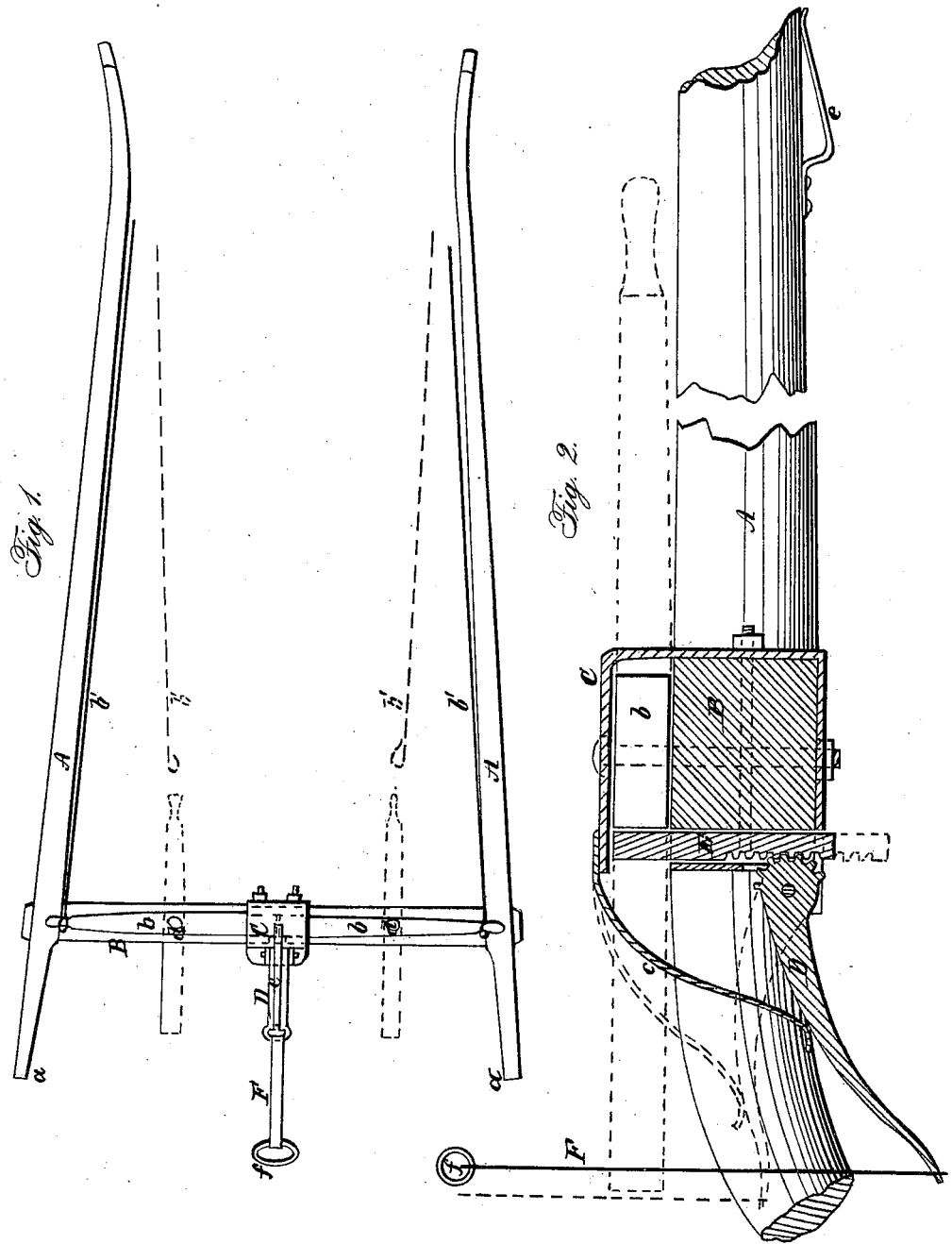
Witnesses:
Inventor:

UNITED STATES PATENT OFFICE.

JAMES T. GUTHRIE, OF LEESBURG, OHIO.

IMPROVEMENT IN MODE OF RELEASING HORSES FROM CARRIAGES.

Specification forming part of Letters Patent No. 51,941, dated January 9, 1866.

*To all whom it may concern:*

Be it known that I, JAMES T. GUTHRIE, of Leesburg, Highland county, in the State of Ohio, have invented an Improved Device for Relieving Horses from Carriages, of which the following is a full and clear description thereof, reference being had to the accompanying drawings, forming a part of this specification.

Figure 1 represents a pair of thills to be attached to a vehicle having my detaching device attached. Fig. 2 is a longitudinal section through the cross-bar, to which my improvement is attached, showing the operation of my improved device for relieving horses from carriages.

In the accompanying drawings, A indicates the thills framed into the cross-bar B at the points $a$. At the inner ends of the thills A are devices for securing the thills to the carriage or vehicle. A plate, C, is bolted to cross-bar B, which it surrounds on three sides, and is situated centrally on the cross-bar. The upper face of the plate, which laps over the top of the cross-bar B, permits the passage of the inner ends of the double whiffletrees $b$ to pass beneath it, as shown in Fig. 2. The double whiffletrees are pivoted upon the upper surface of the cross-bar B, midway between its center and the thills. A securing or retaining bolt, E, which is moved vertically in the rear part of plate C for the purpose of holding securely the whiffletrees $b$, is moved up or down by means of a ratchet upon the bolt E and pinion upon arm D. Spring $c$, attached to plate C, presses down upon the arm D. A strap, F, is secured to the free end of arm D. A ring, $f$, is attached to the end of strap F. $e$ is the breeching-hooks, secured beneath each thill.

The device, by means of which a horse may be relieved or detached from a carriage, is operated as follows: The strap F, to which the ring $f$ is secured, passes into the carriage to be within convenient reach of the occupant. Should the horse become unmanageable and it is desirable to release him from the carriage, the strap F is drawn up. Lever D, operating upon the ratchet in the lower end of retaining-bolt E, permits the whiffletrees to vibrate about the pivots $d$. The traces $b'$ are thus allowed to slip off the end of the whiffletrees. At the same time the breeching-strap passes from within the breeching-hook $e$, and the horse is thus allowed to escape.

Having fully described my invention, the use and operation of its various parts, what I claim as new, and desire to secure by Letters Patent, is—

The double whiffletrees $b$, retaining-bolt E, arm D, spring $c$, and strap F, in combination with cross-bar B, substantially as above described, and for the purpose set forth.

JAMES T. GUTHRIE.

Attest:
WM. DORGAN,
JOS. NEPLER.